United States Patent [19]

Bowman et al.

[11] 3,852,669

[45] Dec. 3, 1974

[54] CIRCUIT TO PROTECT RF OUTPUT AMPLIFIER AGAINST MISMATCH DAMAGE

[75] Inventors: Dennis W. Bowman, Eatontown; Robert E. Horn, Middletown, both of N.J.

[73] Assignee: The United States of America as represented by the Secretary of the Army, Washington, D.C.

[22] Filed: June 26, 1973

[21] Appl. No.: 373,830

[52] U.S. Cl. .............. 325/151, 325/186, 330/207 P

[51] Int. Cl. ............................................. H03g 3/18

[58] Field of Search ........... 325/150, 151, 159, 186, 325/187; 317/20, 48; 324/58 B; 330/207 P

[56] References Cited

UNITED STATES PATENTS

| | | | |
|---|---|---|---|
| 3,020,529 | 2/1962 | Turner | 325/150 |
| 3,366,883 | 1/1968 | Griffin et al. | 325/150 |
| 3,449,680 | 6/1969 | Schilb et al. | 330/207 P |
| 3,641,451 | 2/1972 | Hollingsworth et al. | 325/151 |
| 3,671,879 | 6/1972 | Klanatsky | 330/207 P |

*Primary Examiner*—Benedict V. Safourek
*Assistant Examiner*—Jin F. Ng
*Attorney, Agent, or Firm*—Arthur L. Bowers; Eugene E. Stevens, III; Frank J. Dynda

[57] ABSTRACT

A mismatch protection circuit to protect power output transistors of a communications transmitter from damaging excessive reflected power, as might occur when the antenna is disconnected or broken, which circuit continuously monitors and compares parameters indicative of forward and reflected power or VSWR and when there is excessive mismatch, instantaneously cuts back the dc power delivered to the output transistors to a safe low level, but a level sufficient for continued cutback operation of the protection circuit, when and for so long as the excessive mismatch continues.

6 Claims, 3 Drawing Figures

CIRCUIT TO PROTECT RF OUTPUT AMPLIFIER AGAINST MISMATCH DAMAGE

BACKGROUND OF THE INVENTION

VSWR mismatch protection circuits are in use in rf transmitter circuits to ensure that power output transistors are not damaged when the antenna is uncoupled or when the antenna is suddenly damaged or broken. One type circuit compares a voltage sample representative of the reflected rf power with a constant dc reference voltage. Generally, prior art power cutback circuits use a dc reference voltage and the accuracy of power cutback is dependent upon the accuracy of dc reference voltage regulation and/or forward rf power remaining constant. A regulated power source is not required to be so accurate that a high accuracy dc reference voltage might be obtained from the regulated source. Also zener diodes are not sufficiently dependable to provide a high accuracy dc reference voltage.

An object of this invention is to provide an uncomplicated and highly accurate mismatch protection circuit for output rf power amplifiers.

A further object is to provide a circuit to protect power output transistors from damaging excessive reflected power that might be caused by load (e.g., antenna) mismatch.

A further object is to provide a circuit for VSWR mismatch protection that is completely independent of forward rf power level and that can be set for rf power cutback at the predetermined VSWR or load mismatch condition and is adaptable to all FM systems operating over a wide rf power range and to all AM systems using modulation to 100 percent, i.e., where the ratio of rf average power to peak power is 1:4.

A further object is to provide a mismatch protection circuit of very low current drain during standby and one that does not depend upon an accurate reference voltage.

A further object is to provide an uncomplicated, accurate means of VSWR mismatch protection for rf power amplifiers operating in the HF, VHF, UHF frequency bands and in the higher frequency bands.

SUMMARY OF THE INVENTION

Between an output rf power amplifier and an antenna or other load fed by the amplifier, there is included in the rf power delivering means between the amplifier and the load a low drain means for sampling a parameter representative of forward power and a parameter representative of reflected power. The parameters are rf detected and amplified in a cutback circuit and then a preselected percentage of the parameter representing forward power is compared with the parameter representing reflected power and when the latter is larger and for so long as it remains larger, the cutback circuit connects a voltage-dropping load to the dc power supply for the rf amplifier, instantaneously reducing the output of the rf power amplifier to a safe minimal level, which level is sufficient to continue operation of the cutback circuit. No dc reference level is required.

DESCRIPTION OF THE PREFERRED EMBODIMENTS

Figure 1:
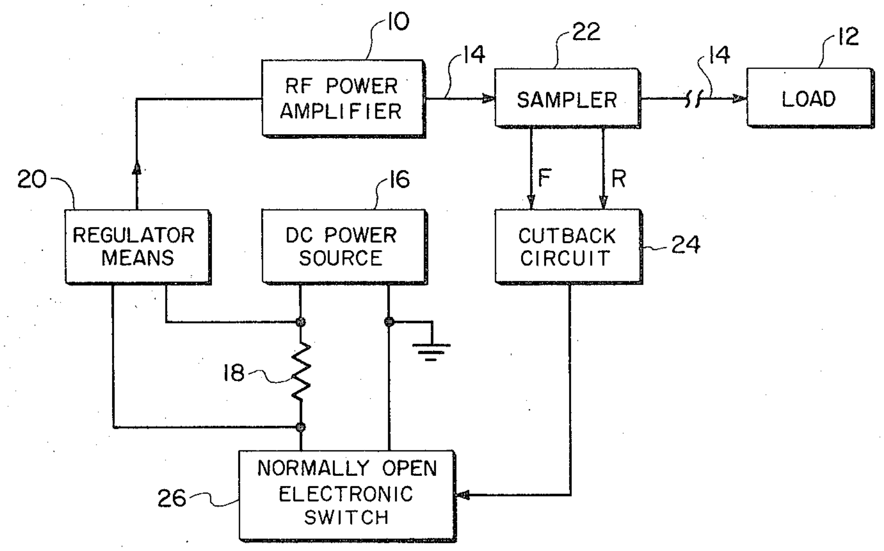
FIG. 1 is a block diagram illustrating the broader aspects of this invention.

In the block diagram shown in FIG. 1, an rf power amplifier 10 feeds a load 12 through an rf transmission line 14. A dc power source 16 is coupled by a resistor 18 and regulator means 20 to the rf power amplifier. A low current drain sampler 22 is coupled in the rf transmission line 14 and provides to cutback circuit 24 samples F and R of parameters representative of forward power and reflected power respectively. The cutback circuit 24 is connected to a normally open electronic switch 26 and close-circuits the electronic switch when and for so long as the sample R rises to a predetermined ratio of the sample F. When the electronic switch 26 is close-circuited, the voltage drop across resistor 18 is increased sufficiently so that the rf power output of the amplifier 10 is reduced to a safe minimal level instantaneously but which safe level output is still sufficient to continue operation of the cutback circuit 24.

Figure 2:
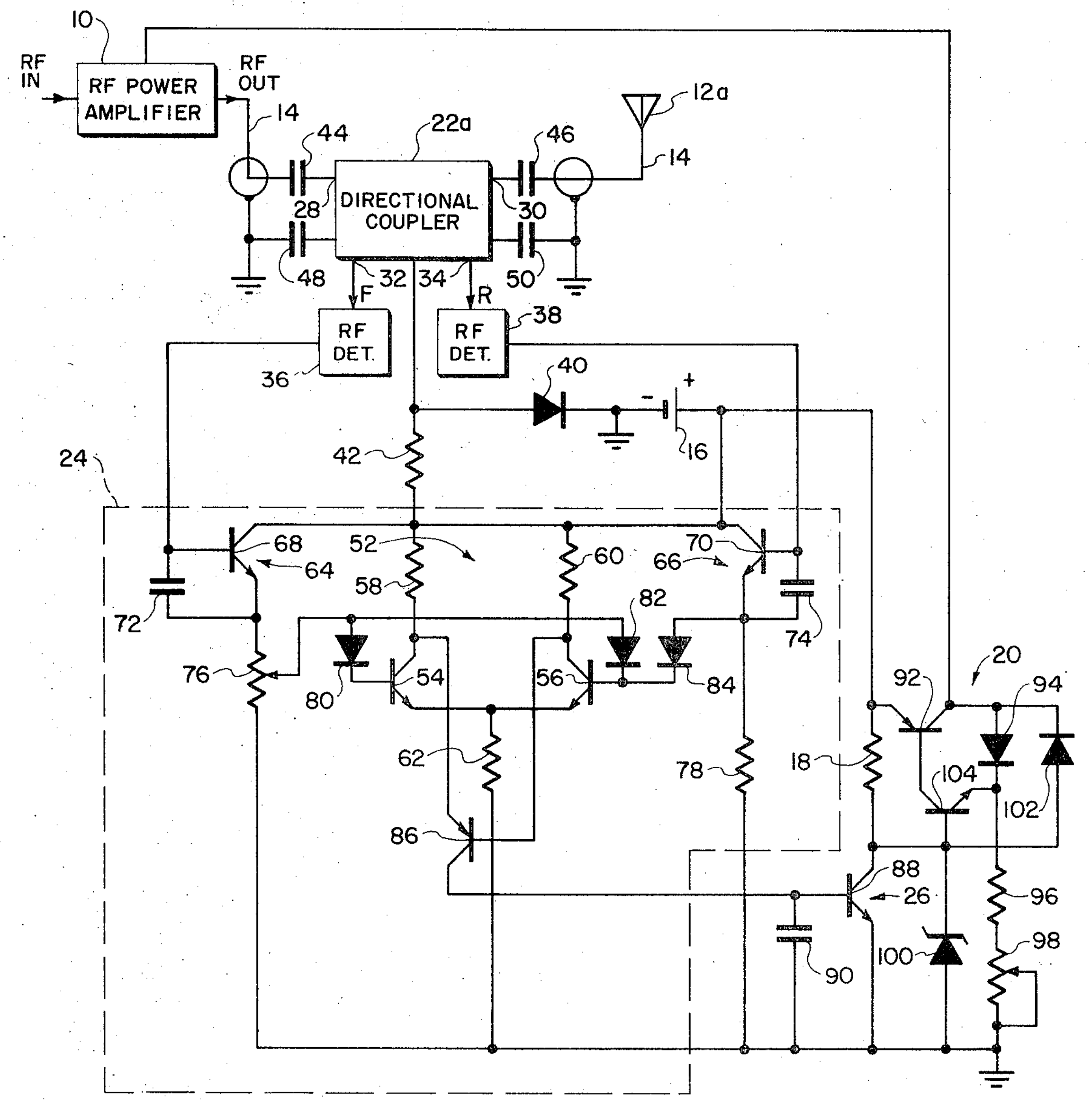
FIG. 2 is a combination schematic circuit and block diagram of the invention in FIG. 1.

In the circuit shown in FIG. 2, an antenna 12*a* is the load for and is fed by rf power amplifier 10. A directional coupler 22*a* functions as the sampler 22 of FIG. 1 and has its input port 28 and its output port 30 connected in series in rf transmission line 14 between amplifier 10 and antenna 12*a*. The output voltage of amplifier 10, i.e., the forward voltage, and the voltage reflected by the antenna 12*a* due to mismatch are continuously sampled by the directional coupler and the samplings F (forward) and R (reflected) are delivered at the other two ports 32 and 34 of the directional coupler. RF detectors 36 and 38 are connected to sampling ports 32 and 34; in FIG. 1, sampler block includes elements such as rf detectors 36, 38. Because detector diodes included in the rf detectors do not conduct until a threshold voltage is exceeded, the body of the directional coupler is raised to a voltage above ground sufficient to prebias the detector diodes forwardly. For this purpose a diode 40 and voltage dropping resistor 42 are connected in series across dc power source 16. The battery symbol used to represent dc power source 16 is not intended in any limiting sense. The cathode end of diode 40 is connected to ground and the anode end is connected to the body of the coupler whereby the voltage drop across diode 40 is the prebias voltage provided for the detector diodes in RF detectors 36, 38. Capacitors 44 and 46 between the coupler ports and the rf transmission line 14 and capacitors 48, 50 between the body of the coupler and the grounded portion of the rf transmission line provide dc isolation.

The directional coupler 22*a* is selected from among the many types available to have the characteristic of minimal power drain from the rf transmission line and still provide sampling voltages of adequate amplitude for the detector diodes. More particularly, a 20db directional coupler which drains about one percent of the power and provides adequate sample voltage for the detector diodes was used successfully in a circuit as shown in FIG. 2.

Cutback circuit 24 in a broken line block in FIG. 2 includes a differential amplifier 52 that includes NPN transistors 54, 56, collector resistors 58 and 60 between the collector electrodes of transistors 54, 56 and the positive terminal of dc source 16, and a resistor 62 between both emitter electrodes of transistors 54, 56 and the grounded negative terminal of dc source 16. A pair of emitter followers 64, 66 couple the outputs of rf detectors 36, 38 to the base electrodes of transistors 54 and 56, match impedances and provide the necessary current gain without loading the sampler. Emitter followers 64 and 66 include NPN transistors 68, 70, rf bypass capacitors 72, 74 connected between base and emitter electrodes of the respective transistors for preventing oscillation, a potentiometer 76 connected between the emitter electrode of transistor 68 and ground, and a fixed resistor 78 connected between the emitter electrode of transistor 70 and ground. The collector electrodes of transistors 68 and 70 are connected to the positive terminal of dc source 16. Diodes 80 and 82 are connected between the tap of potentiometer 76 and the base electrodes of transistors 54 and 56, respectively. A diode 84 is connected between emitter electrode of transistor 70 and the base electrode of transistor 56. Diodes 82 and 84 constitute an OR gate. Adjustment of the potentiometer 76 sets the percentage of the forward voltage sample which is coupled to the differential amplifier. When the potential at the tap of potentiometer 76 is more positive than or equal to the potential at the emitter electrode of transistor 70, there is no difference in potential between the collector electrodes since voltage drops across collector resistors 58 and 60 are equal. However, when the potential at emitter electrode of transistor 70 is more positive than the potential at the tap of potentiometer 76, the voltage drop across collector resistor 60 exceeds the voltage drop across collector resistor 58 and the collector electrode of transistor 54 is at a positive potential relative to the collector electrode of transistor 56.

The emitter and base electrodes of a PNP transistor 86 are connected to the collector electrodes of transistors 54, 56 respectively. Electronic switch 26 includes an NPN transistor 88 and a bypass capacitor 90 connected between the base and emitter electrodes of transistor 88. The collector and emitter electrodes of transistor 88 and resistor 18 are series-connected across the dc source 16. The electronic switch 26 is connected to the collector electrode of transistor 86. Transistor 86 is operable to close circuit the electronic switch 26 when the collector electrode of the transistor 54 is at a positive potential relative to the collector electrode of transistor 56. Conversely, the electronic switch 26 is open-circuited when the collector electrode of the transistor 54 ceases to be at a positive potential relative to the collector electrode of transistor 56.

The details of the regulator means 20 are taken from teachings in the prior art and are not part of this invention. The regulator means shown in FIG. 2 includes a PNP transistor 92 series-connected between the dc power supply 16 and the rf power amplifier 10. A blocking diode 94, a fixed resistor 96 and a variable resistance 98 are connected in series between the collector electrode of transistor 92 and ground. A zener diode 100 is connected between the collector electrode of transistor 88 and ground and a diode 102 is connected between the collector of transistor 92 and the cathode of zener diode 100. An NPN transistor 104 is connected to control the base bias of transistor 92. The regulator means functions in the conventional manner.

Figure 3:
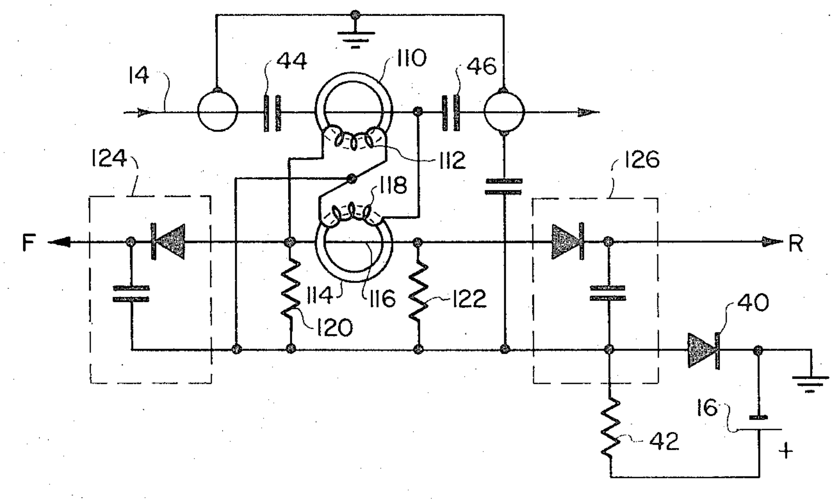
FIG. 3 is a schematic diagram of an alternative sampler for the embodiment shown in FIG. 2.

Another sampler 22 that may be used in this invention is a reflectometer type circuit known in the art one of which is shown in FIG. 3. As in FIG. 1, there are capacitors 44, 46 for dc isolation of a section of transmission line 14. A ferrite ring 110 supports a sensing coil 112 and surrounds the section of transmission line 14 between capacitors 44 and 46. A second ferrite ring 114 surrounds a short length of conductor 116 and supports a coil 118. The coils 112 and 118 have equal numbers of turns and are connected in series between the transmission line 14 section between capacitors 44, 46 and the conductor 116. The junction between the coils is connected to the anode end of diode 40. Resistors 120 and 122 connect the opposite ends of conductor 116, that thread through ferrite ring 114, to the anode end of diode 40. RF detectors 124 and 126 are connected across the resistors 120 and 122 and deliver their respective positive dc voltages representative of forward and reflected power levels to the cutback circuit as shown in FIG. 2.

When the power amplifier 10 is terminated in a matched load, there is no reflected rf power, and both transistors of the differential amplifier conduct equal and minimum collector currents. Then, transistor 86 with its base and emitter electrodes connected to the collectors of transistors 54 and 56 respectively, will not conduct since the quiescent collector voltages of transistors 54 and 56 are equal. If there is mismatch, there is voltage at the anode end of diode 84 as well as at the anode end of diode 82. The larger of the voltages is coupled to the base electrode of transistor 56. If the voltage at the emitter electrode of transistor 70 exceeds that at the tap of potentiometer 76, the differential amplifier is unbalanced and the electronic switch 26 is close-circuited. The switching point where reflected power unbalances the differential amplifier is selectively preset by setting the tap of potentiometer 76.

VSWR (voltage standing wave ratio) is defined as $$\frac{1+\sqrt{P_R/P_F}}{1-\sqrt{P_R/P_F}}$$

It is desirable, though not a limitation, for the cutback circuit to be adjusted to operate when the VSWR level reaches or exceeds 3:1. When the cutback circuit 24 becomes operative it reduces the supply voltage to the power amplifier 10 to minimize rf output. To stabilize the operation of the cutback circuit the supply voltage is decreased to a minor fraction of the normal supply voltage, e.g., 26 volts to 5 volts. The reduced supply voltage continues at the low level until normal VSWR conditions (less than 3:1) are restored. When a mismatched load condition occurs which causes a 3:1 or greater VSWR, the reflected rf power sample voltage exceeds the forward power voltage sample. This results in a forward biased condition of diode 84 and a reversed bias condition of diode 82. With diode 84 switched on, the base-to-emitter voltage of differential amplifier transistor 56 is greater than the base-to-emitter voltage of transistor 54 and there is unequal conduction through transistors 54 and 56. With transistor 56 conducting heavier collector current, transistor 86 is forward-biased. Collector current is initiated in transistor 86 and its magnitude depends on the degree of unbalance in the conduction through transistors 54 and 56; transistor 88 is gated on to conduct heavy collector current. The collector-to-ground voltage of transistor 88 drops to a low level (viz: 5 volts) which in turn results in a reduction of the forward bias of base-to-emitter junction of transistor 92, the series voltage regulator. There is a large drop in the collector current of transistor 104 which is also the base current of series regulator transistor 92 whereby series regulator collector-to-emitter resistance is increased and the power supply voltage to the rf power amplifier is greatly reduced. The amount of reduction is dependent upon VSWR mismatch conditions. When the load VSWR drops to 3:1 or less, the differential amplifier circuit becomes balanced and the normal power supply voltage (e.g., 26 volts) is restored to the rf power amplifier.

The cutback circuit 24 can be adjusted for a range of rf transmitter systems operating at any rf power level down to 1 watt average power and adaptable to most rf power transmitters operating in the HF, VHF and UHF frequency bands.

The following is a list of parts for a circuit that was built.

| | |
|---|---|
| Capacitors | |
| 44, 46, 48, 50 | 1000pF |
| 72, 74, 90 | 820pF |
| Resistors | |
| 18 | 1.5K |
| 42 | 2.7K |
| 58, 60 | 1.5K |
| 62 | 82 ohms |
| 76 | 500 ohms |
| 78 | 470 ohms |
| 96 | 270 ohms |
| 98 | 1K |
| 120, 122 | 47 ohms |
| Transistors | |
| 54 and 56 | 2N2060 |
| 68, 70, 88 | 2N2219 |
| 86 | 2N2906 |
| 92 | 2N3791 |
| 104 | 2N1482 |
| Diodes | |
| 40 | 1N3030 |
| 80, 82, 84 | 1N270 |
| 94, 102 | 1N4246 |
| 124, 126 | 1N933 |
| 100 | 1N3030 |
| Reflectometer | |
| 112, 118 | 10 turns no. 22 AWG enamelled, wire wound on 110, 114. |
| 110, 114 | ⅝ inch diameter ferrite toroid, Q3 material (Indiana General Corp.). |
| DC Source | |
| 16 | 28 volts |

We wish it to be understood that we do not desire to be limited to the exact details of construction shown and described, for obvious modifications will occur to a person skilled in the art.

What is claimed is:

1. In combination with an output rf power amplifier and a dc power source for the rf power amplifier, a load for the rf power amplifier and rf power delivering means coupling the rf power amplifier to the load, a resistor and a normally off electronic switch connected in series across the dc power source, regulator means including a zener diode connected across said electronic switch and short-circuited by said electronic switch when the latter is turned on, for delivering power from the dc power source to the rf power amplifier at one level when the electronic switch is off and at a lower level when the electronic switch is on, means for sampling selected parameters in the rf power delivering means that are representative of magnitude of forward power and reflected power, respectively, power cutback means including a pair of essentially equal gain emitter followers, one of said emitter followers having a potentiometer output, means for coupling the selected parameter representative of forward power to the input of the emitter follower with the potentiometer output and means for coupling the selected parameter representative of reflected power to the input of the other emitter follower, means coupled to the outputs of both emitter followers to turn on said electronic switch only when and for so long as the selected parameters representative of reflected power and forward power, respectively, exceed a predetermined ratio for instantaneously reducing the dc power to said rf power amplifier to substantially reduce the level of forward rf power while continuing operation of said power cutback means.

2. In combination with an output rf power amplifier and a dc power source for the rf power amplifier, a load for the rf power amplifier, and rf power delivering means coupling the rf power amplifier to the load, a resistor and a normally nonconductive electronic switch connected in series across the dc power source, regulator means connected to said dc power source and said rf power amplifier and including zener diode connected across said electronic switch and short-circuited by said electronic switch when the latter is conductive for delivering power from the dc power source to the rf power amplifier at one level when the electronic switch is OFF and at a lower level when the electronic switch is ON, means for sampling selected parameters in the rf power delivering means that are representative of magnitude of forward power and reflected power, respectively, power cutback means coupled to said sampling means and also coupled to said electronic switch and including a pair of emitter followers to amplify the samplings equally, one of said emitter followers having a potentiometer output, means for coupling the selected parameter representative of forward power to the input of the emitter follower with the potentiometer output and means for coupling the selected parameter representative of reflected power to the input of the other emitter follower, a differential amplifier, a pair of diodes coupling the output of the emitter follower with the potentiometer output to the respective inputs of the differential amplifier, another diode coupling the output of the other emitter follower to one of inputs of the differential amplifier whereby the two diodes that are coupled to one input function as an OR gate, a transistor whose base electrode is connected to that output of the differential amplifier corresponding to the OR gate input and one of its emitter and collector electrodes is connected to the other output of the differential amplifier and the other of its emitter and collector electrodes is connected to said electronic switch, whereby said power cutback means amplifies the samplings equally and provides a selected fraction of the amplified forward power parameter and turns on said electronic switch only when, and for as long as the amplified reflected power parameter exceeds the selected fraction of the amplified forward power parameter, for instantaneously reducing the dc power to said power amplifier to substantially reduce the level of forward rf power while continuing operation of said power cutback means.

3. The combination defined in claim 2 wherein said electronic switch is a transistor, one of the emitter and collector electrodes of the second-mentioned transistor is connected to said resistor and the other of the emitter and collector electrodes is connected to the power source, and a capacitor connected between the base electrode and the other electrode, and the base electrode is connected to the first mentioned transistor, whereby said electronic switch is close circuited when a positive potential is applied to its base electrode by the first-mentioned transistor.

4. The combination defined in claim 3 wherein said means for sampling selected parameters in the rf power delivering means is a reflectometer.

5. The combination defined in claim 3 wherein said means for sampling selected parameters in the rf power delivering means is a directional coupler having a pair of output ports that provide equal samplings of the forward voltage and the reflected voltage respectively.

6. The combination defined in claim 5 further comprising rf detector means for coupling the forward voltage sampling output of the directional coupler to the input of said emitter follower having the potentiometer output and rf detector means coupling the reflected voltage sampling output of the directional coupler to the input of the other emitter follower.

* * * * *